United States Patent [19]

Hooykaas

[11] Patent Number: 4,713,223
[45] Date of Patent: Dec. 15, 1987

[54] METHOD OF PROCESSING AN IRON-CONTAINING DUST OBTAINED IN THE PREPARATION OF IRON OR STEEL

[75] Inventor: Carel W. Hooykaas, Rotterdam, Netherlands

[73] Assignee: Pelt & Hooykaas B.V., Rotterdam, Netherlands

[21] Appl. No.: 891,416

[22] Filed: Aug. 1, 1986

Related U.S. Application Data

[63] Continuation of Ser. No. 741,008, Jun. 4, 1985, abandoned.

[30] Foreign Application Priority Data

Jun. 5, 1984 [NL] Netherlands ............................ 8401796

[51] Int. Cl.$^4$ ............................................. C01G 49/02
[52] U.S. Cl. ...................................... 423/140; 423/92; 423/98; 423/101; 423/109; 423/150; 423/632
[58] Field of Search .............. 75/101 BE, 101 R, 114, 75/120, 121, 25; 423/92, 139, 98, 150, 632, 101, 100, 109, 140

[56] References Cited

U.S. PATENT DOCUMENTS

| | | | |
|---|---|---|---|
| 3,375,069 | 3/1968 | Duval | 423/150 |
| 4,124,462 | 11/1978 | Reinhardt et al. | 423/109 |
| 4,317,804 | 3/1982 | Ichijo | 423/139 |
| 4,500,498 | 2/1985 | Kruesi et al. | 423/100 |
| 4,572,771 | 2/1986 | Duyvesteyn et al. | 423/140 |

*Primary Examiner*—Robert L. Stoll
*Attorney, Agent, or Firm*—Watson, Cole, Grindle & Watson

[57] ABSTRACT

Iron is recovered from an iron-containing dust obtained in processing iron or steel by dissolving iron and bivalent metals present in the dust in an acid. Subsequently the iron is precipitated as iron hyroxide by adding an alkaline substance or ammonia to adjust the pH to 5 to 8. Before or during precipitation of any iron the bivalent metal ions present, such as zinc, cadmium and lead, are converted into a soluble complex by the addition of a complexing agent, preferred complexing agents being polyamines, particularly triethylene tetramine. The process may be conducted more than once in the same solution, thereby providing a final solution containing considerable amounts of zinc, cadmium, or other bivalent metals, which may be separated by boiling or precipitation.

The complexing agent may be recovered by distillation after having made the complexes strongly alkaline or by precipitation by adjusting the pH to 1 and recovering the salt of the complexing agent such as a hydrochloric acid salt of the complexing agent.

13 Claims, No Drawings

METHOD OF PROCESSING AN IRON-CONTAINING DUST OBTAINED IN THE PREPARATION OF IRON OR STEEL

This application is a continuation of application Ser. No. 741,008, filed June 4, 1985, now abandoned.

BACKGROUND OF THE INVENTION

1. Field of the Invention

This invention relates to a method of processing an iron-containing dust obtained in the preparation of iron or steel.

2. Description of the Prior Art

An iron-containing dust of this type is obtained, for example, by collecting blast-furnace dust which escapes from blast-furnaces and containing iron, zinc and lead. The latter two metals are a consequence of the presence of small quantities of zinc lead which occur as impurities in the iron ore.

On the other hand, a similar iron-containing dust is obtained, usually in the form of wet waste dust, by collecting the dust escaping from steel works, which also contains a considerable quantity of zinc. This zinc originates from the paint coating or galvanized protective coating on the scrap added to the molten iron in the steel works.

This iron-containing dust is a considerable nuisance to the iron or steel manufacturing industry, because, notwithstanding the high iron content, this iron-containing dust cannot be reused in iron manufacture because of the large quantities of zinc. The iron-containing dust obtained from a blast-furnace in fact contains 0.8% zinc and 36% iron, while the zinc percentage in the dust collected from steel works is 1.5% and the iron content 60%.

Because of the impossibility of recycling these products to the blast-furnaces or steel works, this iron-containing dust therefore has to be stored, and this involves considerable areas being occupied while the presence of the zinc readily results in an undesirable pollution of the environment due to the leaching out of the zinc. This holds the more if, for example, in addition to the zinc very small quantities of cadmium are present in the iron-containing dust.

SUMMARY OF THE INVENTION

It is the main object of the invention to provide a method of processing an iron-containing dust of this type without the above disadvantages and whereby the iron present in the iron-containing dust can be reused in the iron or steel manufacturing process.

According to the invention this object is achieved by means of a method of processing an iron-containing dust obtained in the preparation of iron or steel wherein the iron-containing dust is dissolved in an acid medium, bivalent metal ions present in the formed solution are converted into a complex by adding a complexing agent, and iron is precipitated from the solution and recovered.

By using this method, zinc, lead and any cadmium present are converted into a complex which remains in solution during the precipitation of the iron, so that an iron-containing product is obtained from the iron-containing dust and can be recycled to the blast-furnace.

Moreover, by means of this method it is possible to reduce the zinc content in the above-mentioned iron-containing dust to below limits, allowing the reuse of the dust by mixing same with iron as obtained according to the invention.

On the other hand, the complexing agent can readily be recovered by precipitating same and reusing the medium present to treat the iron-containing dust. The final result is a solution which contains large quantities of bivalent metal ions such as zinc, lead and cadmium.

Particularly advantageously, the iron is precipitated from the solution by alkalizing the solution, whereafter the iron is recovered. A treatment of this kind can be carried out very easily.

Preferably, the alkalization is effected by adding an alkaline solution, preferably an ammonia solution. This presents the advantage of the use relatively cheap reactants for precipitating the iron.

Particularly advantageously, after the separation of the iron the complexing agent, which may or may not be fixed to the bivalent metal ions, is precipitated and recovered for a new treatment of iron-containing dust.

Preferably the iron-containing dust is dissolved by boiling with a hydrochloric acid solution, preferably by 30 min. boiling in a hydrochloric acid solution of 5 to 10%. However, iron is also substantially dissolved by stirring the iron dust with 10% hydrochloric acid.

Very advantageously, the precipitation of the complexing agent is carried out by adding hydrochloric acid, whereafter the complexing agent can be redissolved in ammonia.

The complexing agent may also be recovered by making the solutions of the complexes of bivalent metal ions and complexing agent strongly alkaline by adding sodium hydroxide and distilling the complexing agent. E.g. triethylene tetramine has a boiling point of 266° C. and of ethylene diamine 116° C.

Suitable complexing agents are thioethers such as the water immiscible liquid $(C_4H_9)S$ in hydrochloric acid solution, bis(2-ethylhexyl)phosphate in liquid form in an acid medium, cyclohexanone oxim/oleic acid in hexane, ammonia and polyamines.

Advantageously polyamines are used as complexing agents such as tetraethylene pentamine, triethylene tetramine, diethylene triamine and ethylenediamine.

A very advantageous complexing agent is triethylene tetramine, which selectively forms a complex with bivalent metals, particularly if zinc is present in the iron to be processed.

To precipitate the iron from the solution obtained by dissolving the iron-containing dust in hydrochloric acid, the pH of the solution is adjusted with ammonia to 5-8 lead, cadmium, zinc and the like remaining in solution as a complex. Preferably the pH of the solution is adjusted to 7-8.

Of course the selective or other precipitation of different metal ions can be controlled by adjusting the pH.

DESCRIPTION OF THE PREFERRED EMBODIMENTS

Example I 100 kg of iron-containing dust liberated in the preparation of steel caught by means of a wet filter and containing 60% of iron and 1.5% of zinc in addition to other metals, were dissolved in 1000 l of 10% hydrochloric acid solution.

After the dissolution of the iron by the hydrochloric acid, during which zinc and any cadmium and lead as present, together with other metals, were dissolved, any non-soluble solids present are allowed to settle in a settling tank. The resulting solution containing dissolved iron, zinc, lead and/or cadmium and/or other metals was then mixed with 1 kg of triethylene tetramine. After 5 minutes' agitation ammonia solution was added to the solution to adjust the solution to a pH of 5.

The addition of ammonia results in iron being precipitated in the form of iron hydroxide and at least 90% of the zinc, lead and/or cadmium remain in solution.

The precipitated iron is filtered off and made suitable for re-use.

Any quantity of triethylene tetramine still present in the solution and which may or may not be fixed to zinc, lead and/or cadmium, is precipitated by adding hydrochloric acid to give a pH of 1. The triethylene tetramine is then precipitated in the form of the hydrochloric salt. The triethylene tetramine can then be re-dissolved by adding a new solution of dissolved iron-containing dust in an acid.

Iron-containing dust is therefore added to the remaining solution, acidified with hydrochloric acid, and the entire process indicated above is repeated.

The final result is a solution containing considerable quantities of zinc, which can be separated by boiling or precipitation.

Example II

Example I is repeated by adding triethylene tetramine in an excess of 50, 25 and 5 times respectively with respect to the amount of zinc. After adjusting to a pH of 7.5 involving the precipitation of iron hydroxide the solution only contains 2.4; 1.6 and <0.1 respectively of the iron as present before precipitation and 100.5; 100.9 and 93.4% respectively of the original zinc is still dissolved.

Example III 100 kg of iron-containing dust obtained in the preparation of iron, in a blast furnace, containing 0.8% zinc and 36% iron in addition to other metals, were dissolved in 700 liters of 10% hydrochloric acid solution by 30 min. boiling.

The remaining procedure was as in Example I.

Example IV

Example I is repeated but tetraethylene pentamine is added as complexing agent. Zinc remains substantially in solution.

Example V

Example II is repeated but the complexing agent is ethylene diamine. Using said complexing agent in an excess of 50, 25 and 5 times provides the following results:

| pH | Complexing agent (in excess) | Amount of Fe remaining dissolved in % of total iron | Amount of Zn remaining dissolved in % of total zinc |
|---|---|---|---|
| 5.5 | 50 | 16% | 71 |
| | 25 | 17% | 79 |
| | 5 | 17% | 73 |
| 7.5 | 50 | <0.1 | 35 |
| | 25 | <0.1 | 26 |
| | 5 | <0.1 | 19 |

In comparison a 50 times excess of diethylamine provides at a pH of 5.5 a solution still containing 16% of the original iron and 72% of the original zinc.

What is claimed is:

1. A method of recovering iron from a waste material generated during the processing of iron or steel, said waste material containing predominantly iron together with bivalent materials selected from the group consisting of zinc, lead and cadmium, said method comprising the steps of
    (1) contacting the waste material with an aqueous hydrochloric acid solution so as to dissolve at least all the iron from the waste material in the acid medium, thus providing an iron-rich solution,
    (2) adding a complexing agent selected from the group consisting of thioethers in hydrochloric acid solution, liquid bis(2-ethylhexyl)phosphate in an acid medium, cyclohexanone oxim/oleic acid in hexane, and polyamines to said iron-rich solution so as to form a soluble complex with any of said bivalent metals which have dissolved in said iron-rich solution,
    (3) adding an ammonia solution to said iron-rich solution to adjust its pH to between 5 and 8, thus causing iron to precipitate from said iron-rich solution as iron (III) hydroxide, leaving a complex-containing solution,
    (4) recovering said precipitated (III) hydroxide, and
    (5) recovering said complexing agent from said complex-containing solution, thus leaving a resultant solution containing said bivalent metals.
2. The method as defined in claim 1, wherein in step (1) the waste material is added to an aqueous hydrochloric acid solution.
3. The method as defined in claim 1, wherein in step (1) the waste material is added to an aqueous solution and then hydrochloric acid is added thereto.
4. The method as defined in claim 3, wherein the resultant solution obtained in step (5) is used as said aqueous solution to which the waste material is added.
5. The method as defined in claim 1, wherein in step (3) the pH is adjusted to between 7 and 8.
6. The method as defined in claim 1, wherein step (5) includes the steps of precipitating the complexing agent from the complex-containing solution obtained in step (3) and recovering the precipitated complexing agent.
7. The method as defined in claim 6, wherein step (5) includes the steps of adjusting the pH of said complex-containing solution to make it alkaline and then distilling the complex-containing solution to recover the complexing agent therefrom.
8. The method as defined in claim 6, wherein step (5) includes the steps of adding hydrochloric acid to said complex-containing solution to precipitate the complexing agent and recovering the precipitated complexing agent.
9. The method as defined in claim 1, wherein the complexing agent is a polyamine selected from the group consisting of tetraethylene pentamine, triethylene tetramine, diethylene triamine and ethylenediamine.
10. The method as defined in claim 1, wherein the concentration of hydrochloric acid in said aqueous hydrochloric acid solution used in step (1) is between 5 and 10%.
11. The method as defined in claim 1, wherein said waste material contains 36% iron and 0.8% zinc.
12. The method as defined in claim 11, wherein in step (1) 100 kg of said waste material is dissolved in 1000 l of 10% hydrochloric acid solution.
13. The method as defined in claim 1, wherein said waste material contains 60% iron and 1.5% zinc.

* * * * *